3,120,479
PROCESS FOR THE PHOTOCHEMICAL OXIDATION OF NO TO NO₂

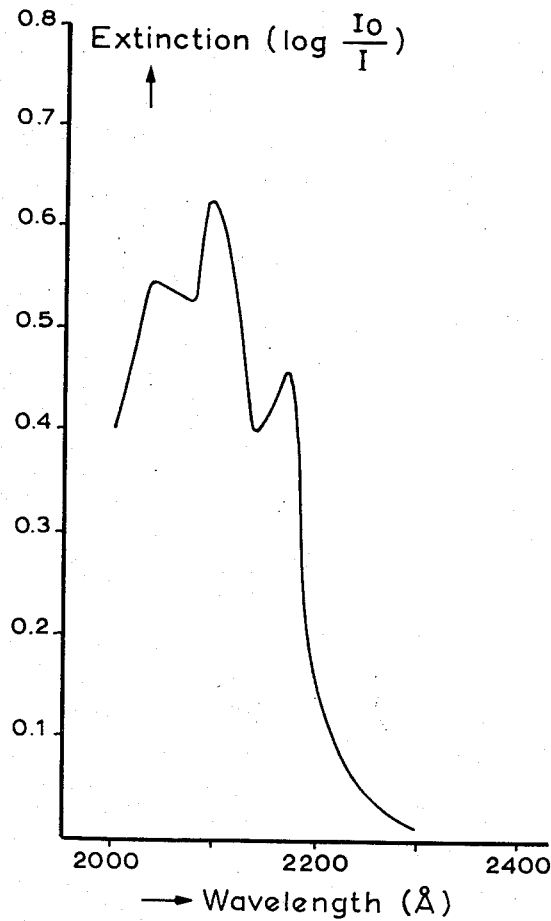

Michaël J. Dols, Beek, and Cornelis Bokhoven, Geleen, Netherlands, assignors to Stamicarbon N.V., Heerlen, Netherlands
Filed July 27, 1961, Ser. No. 127,349
Claims priority, application Netherlands July 28, 1960
8 Claims. (Cl. 204—157)

The present invention relates to the photochemical oxidation of NO to $NO_2$. More particularly, the invention is concerned with the conversion of NO in gas mixtures containing diolefines and oxygen, e.g. coke oven gas, to form $NO_2$ by photochemical oxidation.

It has previously been proposed that the NO which is present as a contaminant in coal gas (coke oven gas) and causes clogging due to gum formation, should be removed by a rapid oxidation to $NO_2$ by means of ozone. The $NO_2$ thus produced is subsequently washed out, either as such or in the form of gummy products formed by reaction with diolefines which are also present in the gas. The coal gas includes an amount of oxygen and it has been suggested that the quantity of ozone required for the NO oxidation might be generated in the gas by radiating the same with ultraviolet light whereby part of the oxygen present in the gas is converted into ozone.

In order to form ozone by irradiation of oxygen with ultraviolet light, it is necessary for the light to have a wave length of approximately 1850 A. or at least a wave length smaller than 2000 A. However, it has been found that the desired generation of ozone does not succeed, presumably because the oxygen concentration in the irradiated gas is very low, viz. 0.5 percent by volume.

There is reason for assuming that the photochemical oxidation of NO in coal gas does not result in the direct formation of $NO_2$, but that this oxidation proceeds via a diolefine peroxide, the formation of this diolefine peroxide determining the rate at which the oxidation takes place (Het Gas, 1944, page 87). In that case the reaction mechanism might be represented by the following equation wherein D denotes a diolefine which is normally present in the gas:

$$2D + O_2 \rightarrow D_2O_2 \quad (1)$$
$$D_2O_2 + NO \rightarrow D_2O_3N \quad (2)$$
$$D_2O_3N + NO \rightarrow D_2O_4N_2 \quad (3)$$
$$D_2O_4N_2 + O_2 \rightarrow D_2O_2 + 2NO_2 \quad (4)$$
$$\overline{2D + 2NO + 2O_2 \rightarrow D_2O_2 + 2NO_2 \quad (5)}$$

It has now been found that this primary reaction, the formation of the peroxide, and consequently the oxidation of NO to $NO_2$, proceeds at a particularly rapid rate if the gas containing NO, oxygen, and diolefine, is irradiated with ultraviolet light having such a wavelength that there is no formation of ozone. The wavelength must also be of an order of magnitude which corresponds to the wavelength range in which the maximum in the extinction curve of diolefine present in the gas occurs. An example of an extinction curve of 1,3-butadiene is shown in the annexed graph.

The influence of wavelength on the oxidation has been examined by irradiating the gas containing NO, oxygen and diolefine, with ultraviolet light from which certain wavelengths have been removed by filtration. It appears that, if the diolefine present is butadiene, oxidation of NO only takes place when the ultraviolet light contains light waves having a wavelength of 2050–2200 A. On the other hand, when the gas contains a large amount (e.g. 0.1% of its volume) of cyclopentadiene instead of butadiene, ultraviolet light having a wavelength of 2400–2500 A. must be used. The wavelengths required correspond to the maximum in the extinction curve of the diolefine concerned. Usually these wavelengths will fall within the range of 2000 to 2400 A. but specific values must be selected in each case to give freedom from ozone formation and the lengths corresponding to the maximum in the extinction curve of the diolefine or diolefines involved.

A small amount of diolefine is required for obtaining a rapid oxidation of NO into $NO_2$. This is apparent from the following example: A gas mixture consisting 0.3 percent by volume of $O_2$, a constant amount of NO ($2.0 \times 10^{-4}$ millimoles, corresponding to 0.25 p.p.m.), a variable amount of butadiene and the balance $N_2$, was exposed to ultraviolet light having wavelengths between 2050 and 3500 A. In this test, the gas mixture was allowed to flow through a quartz tube having a length of 250 mm. and a diameter of 20 mm., at the rate of 60 litres/h.

The results are summarized in the table below:

| Butadiene present in percent by volume | NO initially present, in millimoles | Percent $NO_2$ obtained based on the maximum amount that could be obtained ($2.0 \times 10^{-4}$ millimol) (No formation of ozone) |
|---|---|---|
| 0.0 | $2.0 \times 10^{-4}$ | 0 |
| 0.001 | $2.0 \times 10^{-4}$ | 64 |
| 0.005 | $2.0 \times 10^{-4}$ | 100 |
| 0.01 | $2.0 \times 10^{-4}$ | 100 |
| 0.05 | $2.0 \times 10^{-4}$ | 100 |
| 0.1 | $2.0 \times 10^{-4}$ | 100 |

In keeping with the above, the diolefine should comprise from about 0.003 to 1% of the volume of the gas mixture at normal pressure in order to obtain effective conversion of the NO to $NO_2$ according to the present invention. The amount of oxygen in the gas may be varied but should amount to from 0.1 to 1.0% of the total gas volume at atmospheric pressure and temperature. The necessary amount of diolefine and oxygen may be added to the gas mixture if the latter does not already contain sufficient quantities of these materials. The amount of NO will necessarily vary depending on the nature of the gas involved but in most instances will be between $10^{-6}$ and $10^{-4}$ percent by volume or 0.01 to 1 part per million parts by weight of the gas. Suitable diolefines for use herein are, for example, 1,3-butadiene, 1,2-butadiene, trans-1,3-pentadiene, cis-1,3-pentadiene, 1,3-cyclopentadiene.

The photochemical oxidation of NO to $NO_2$ according to the invention can be used both in the analytical determination of NO in gas mixtures and in the removal of NO from these gas mixtures.

An important technical application is the rapid oxidation of NO in coal gas and the subsequent washing out of $NO_2$ with, if necessary, a removal of any gums present by washing. These gums are formed by reaction with $NO_2$, and may be removed from the gas by means of an oil washing.

The invention is illustrated, but not limited, by the following example:

Coke oven gas consisting of 0.5% oxygen, 0.01% butadiene, $10^{-5}$ percent NO with the balance $H_2$, $CH_4$, $N_2$, CO and $C_2H_4$, all percentages being based on the total volume of gas, was passed at atmospheric pressure and temperature (20–25° C.) through a quartz tube having a length of 250 mm. and a diameter of 20 mm. at the rate of 60 litres/hour. During this flow, the gas was exposed to ultraviolet light having wavelengths between 2050 and 3500 A. Analysis of the thus treated gas showed no ozone present and the essentially complete conversion of the NO therein to $NO_2$. This $NO_2$ was removed from the treated gas mixture by washing with a dilute solution of sodium hydroxide followed by an oil wash to remove any gummy residue in the gas. The resulting gas was essentially free from NO, $NO_2$, ozone and gums.

It will be appreciated that various modifications may be made in the invention described herein without deviating from the scope thereof as set forth in the following claims wherein we claim:

1. In a process for the photochemical oxidation of NO to $NO_2$ in a gas mixture containing diolefine and oxygen wherein the oxidation is carried out with ultraviolet light, the improvement which comprises utilizing ultraviolet light that has a wavelength such that no ozone is formed and which substantially corresponds to the maximum in the extinction curve of diolefine present in the gas mixture.

2. The process of claim 1 wherein said oxidation is used for the analytical determination of NO in said gas.

3. The process of claim 1 wherein said oxidation is used for removing NO from said gas.

4. The process of claim 3 wherein said gas is coal gas.

5. The process of claim 4 wherein the $NO_2$ formed in said gas is removed by washing.

6. The process of claim 1 wherein said gas contains from 0.001 to 0.5% by volume of diolefine and from 0.05 to 1.0% by volume of oxygen at atmospheric pressure and temperature.

7. The process of claim 1 wherein said diolefine is a butadiene.

8. The process of claim 1 wherein said wavelength is in the range of 2000 to 2400 A.

References Cited in the file of this patent
UNITED STATES PATENTS
2,134,206 Roberts _____ Oct. 25, 1938